Figure 1:
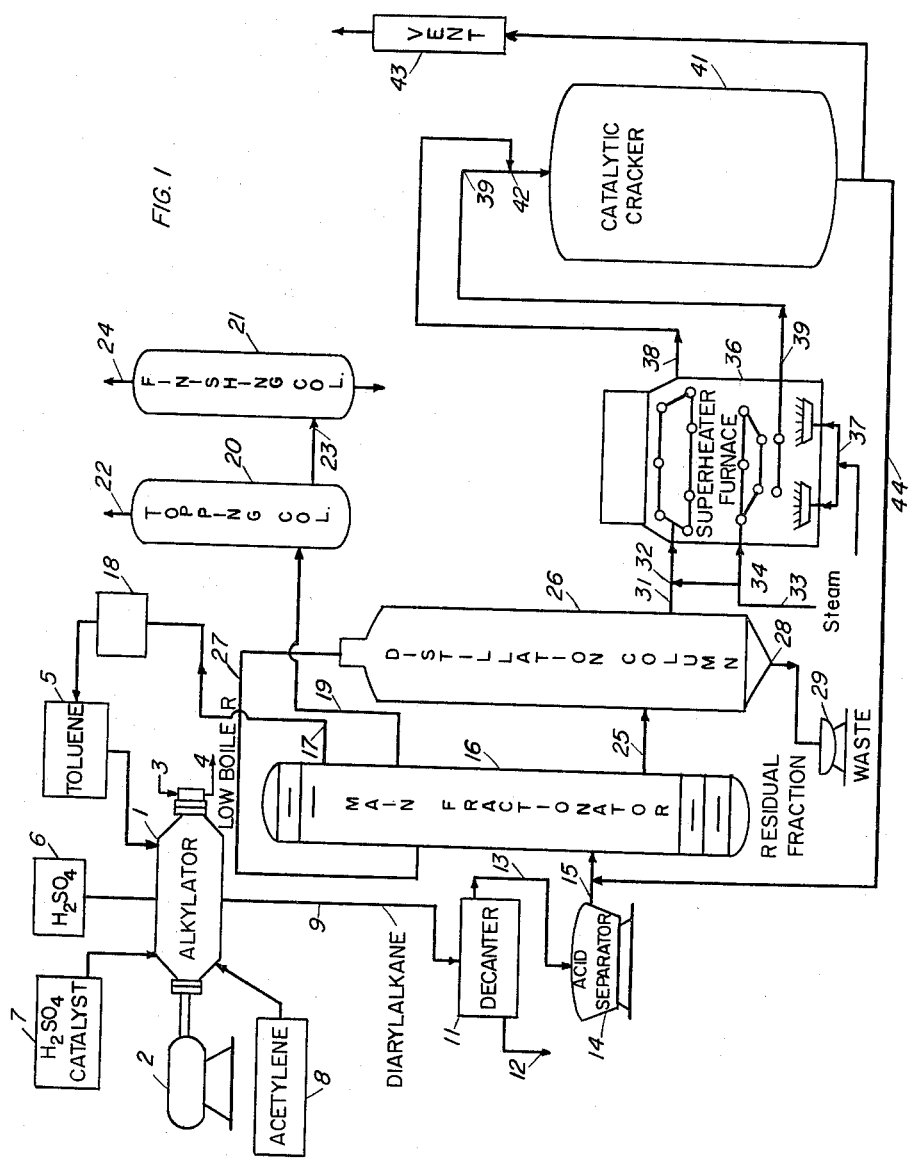

United States Patent Office 3,025,330
Patented Mar. 13, 1962

3,025,330
PREPARATION OF VINYL AROMATIC
COMPOUNDS
David S. Hoffenberg and James E. Longfield, Stamford,
Conn., assignors to American Cyanamid Company,
New York, N.Y., a corporation of Maine
Filed Aug. 26, 1959, Ser. No. 836,241
6 Claims. (Cl. 260—650)

This invention relates to the preparation of vinyl aromatic monomers by the catalytic cracking of unsymmetrical diarylalkanes. More particularly, this invention relates to the treatment of the diarylalkane cracking feed to improve the conversion of the diarylalkane in the catalytic cracking of unsymmetrical diarylalkanes. In particular, the invention resides in the discovery of the adverse effect of sulfur and to a lesser extent of other impurities on diarylalkane catalytic cracking reactions and with the process for the removal of these foreign materials from the diarylalkane cracking feed.

During the continuous catalytic cracking of diarylalkanes in the preparation of polymerizable compounds therefrom, impurities including substantial amounts of sulfur and sulfur bearing compounds, certain unsaturated diaryl compounds, low molecular weight polymeric substances and tars are accumulated in the cracking feed. The sulfur and sulfur containing compounds arise from two sources, namely by the addition of sulfur into the main fractionator to inhibit polymerization of the vinyl aromatic monomer during purification and by being carried over from the alkylating area where they are formed in minor quantities by side reactions involving the sulfuric acid catalyst. The unsaturated diaryl compounds and the tars arise from side reactions involved throughout the whole process. These foreign materials are largely responsible for diminished conversion when the diarylalkanes are catalytically cracked. These impurities which build up considerably during recycling have been a major problem in the production of polymerizable product. The effect of unsaturated materials is demonstrated by the disclosure of the Saunders et al. U.S. Patent 2,846,479. Sulfur in the cracking feed is a main contributor in causing a lowering of the conversion. Elimination or minimization of the effect of sulfur by known procedures such as hydrosulfurization technique, for example, is impractical because the treatment prematurely decomposes the diarylalkane. Sodium treatment for removal of sulfur in the organic stream is also impractical because of its expense. We have discovered that the removal of sulfur from the diarylalkane cracking feed may be effectively and substantially accomplished by removing from the feed a small fraction, i.e., less than 5% of the lowest boiling material, and a small fraction of residual highest boiling material, i.e., not more than 5% and more particularly, a fraction of about 3%. The result as hereinafter described more in detail is a remarkable improvement in the conversion of the diarylalkane. The conversion is increased by about ⅓ or approximately 15–20% based on the diarylalkane fed.

According to the invention, we have discovered that the removal of the small quantities of lowest boiling fractions and highest boiling fractions from the organic stream which is fed to the catalytic cracker provides an extremely attractive and unexpected improvement in conversion on catalytic cracking of the diaryl compound.

It is therefore an object of this invention to provide a procedure for improving the conversion of diarylalkane. More particularly, it is an object of the present invention to condition the diarylalkane cracking feed to promote improved yields by removal of a small fraction of lowest boiling material and a small fraction of the highest boiling material. Additional features include reduced build-up of scale in the system and increased catalyst life. These and other objects and advantages will become apparent as the description of the invention proceeds.

Figure 2:
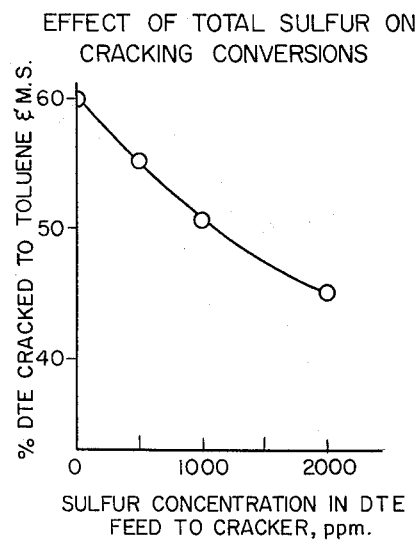
Figure 3:
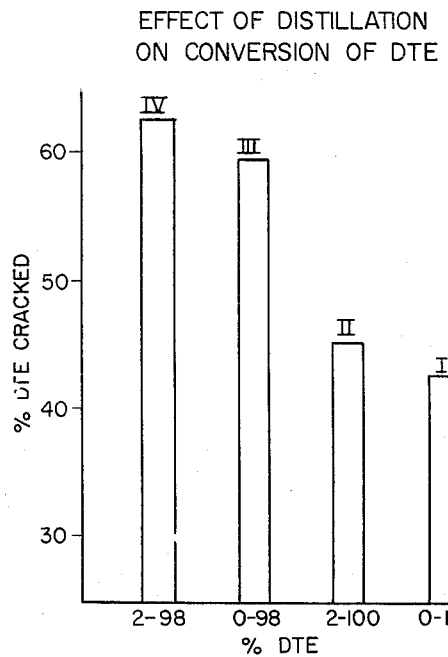
Figure 4:
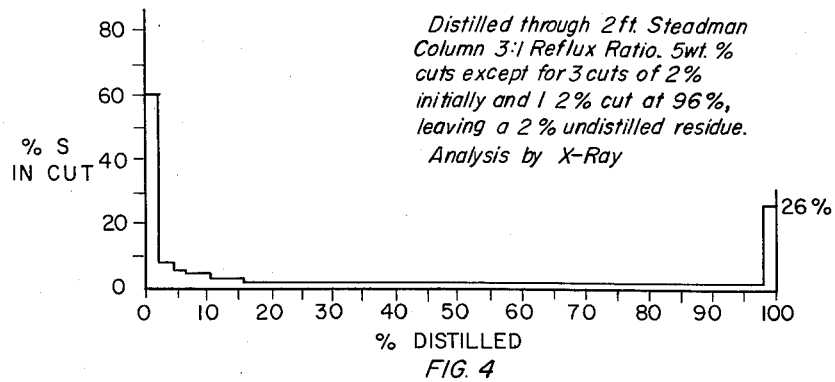

The invention will be further described by reference to the accompanying drawing wherein:

FIG. 1 is a flow sheet showing diagrammatically a process for the production and cracking of diarylalkanes in which one embodiment of the invention is incorporated, and FIGS. 2–4 are graphs showing the improvements obtained upon removal of the small fractions of lowest and highest boiling fractions from the diarylalkane prior to cracking.

The process in connection with the drawing describes the system in connection with the preparation of methylstyrene from 1,1-ditolylethane (DTE) but it will be apparent that the use of this specific compound is illustrative only of other materials hereinafter disclosed.

Referring to FIG. 1, the alkylator is indicated generally by reference numeral 1. One or more of these units may be employed as described in U.S. Patent 2,734,928. This is a reaction vessel equipped with an agitator operated by a motor 2 and with internal cooling coils through which a suitable coolant such as liquid ammonia is introduced and withdrawn as through lines 3 and 4, respectively. The alkylator is charged continuously with a stream of toluene from a toluene storage tank 5, a stream of sulfuric acid of about 98% concentration from tank 6, and a stream of mercuric sulfate or other mercury salt along with sufficient water to bring the sulfuric acid concentration within the alkylator to about 95% $H_2SO_4$. The resulting mixture is maintained at about 0°–10° C. while acetylene from storage area 8 is continuously introduced and reacted with the toluene.

The alkylator reaction product 9 preferably treated by quenching with water according to the procedure described in the pending U.S. patent application, Serial No. 762,429, filed on September 2, 1958, now U.S. Patent No. 2,979,547, is separated from the lower layers withdrawn at 12 and comprising an interphase layer containing most of the mercury and lower acid layer in the decanter 11. The upper alkylate layer is separated from substantially all of the residual acid content at 14 and fed at 15 into the main fractionator 16 where the diarylalkane is separated from other organics present such as toluene along with effluent from the catalytic cracker 41 which is fed back to the main fractionator for preliminary purification. The uppermost stream comprising largely toluene and steam are withdrawn at 17 and fed to a toluene purifier at 18. The purified toluene is fed back to storage 5.

The diaryl compound to be catalytically converted to form polymerizable material is withdrawn from the main fractionator 16 and introduced at 25 into the column 26. It is then distilled to effect removal of the lowest boiling fraction through line 27 which preferably does not exceed 5% and usually need be only about 2%. A residual fraction of about 3% is withdrawn at 28, the latter stream being disposed of as waste at 29. The highest boiling or residual fraction of about 3% contains about 25–30% of the sulfur originally in the diarylalkane feed. The lowest boiling fraction (comprising less than 5% and often only 2% of the feed entering at 25) contains about 60% of the sulfur. This lowest boiling fraction is reintroduced into the main fractionator 16 where the diarylalkane is reprocessed.

The distilled alkylate at 31 from which the lowest and highest boiling fractions have been removed and thus substantially freed of sulfur and various other impurities such as ditolylethylene, low molecular weight polymers and tars, is vaporized and mixed with steam injected at 32 from a source 33 through the regulator valve 34. In order to preclude premature thermal decomposition of the diarylalkane, vaporization and heating of the diarylalkane with diluent injection in the furnace 36 is at temperatures near but below the thermal decomposition temperature of the diarylalkane. A suitable source of heat is shown being introduced into the furnace at 37 providing a temperature differential in the furnace such that the exit stream at 38 is of the order of about 425° C. and that of the steam or other diluent at 39 of the order of about 650° C. A requirement to prevent decomposition is that the heating medium introduced at 32 and to which the diarylalkane is exposed in the furnace 36 must not be higher in temperature than the thermal decomposition temperature of the organic compound. It has been found that the diarylalkane purified according to the invention results in substantially less scale formation in lines 31 and 38. After vaporization and heating, the organic compound is mixed with the high temperature diluent stream preferably as close to the introduction point of the mixture into the catalytic cracker 41 as possible, but at a point of sufficient distance from the catalytic reactor, as shown at 42, so as to permit good mixing of the two streams before contact of the intimate mixture of diluent and diarylalkane with catalyst in the cracker 41. This distance from the cracker unit varies according to the velocity of streams, ratio of diluent to organic, volume fed, and the like. The steam to organic ratio may be as high as 250 mols of diluent steam per mol of organic compound, or more, although such high ratios become more costly. The preferred ratio of stream of diarylalkane is from 5:1 to 120:1, respectively. The vent 43 is for the purpose of allowing small quantities of hydrogen and any hydrogen sulfide to be removed.

Compounds which may be thermally cracked according to the invention are diarylalkanes having at least two carbon atoms and preferably between 2 and 5 carbon atoms in the alkane chain and having two aryl substituents attached to one of said carbon atoms are such as each of the isomers of 1,1-ditolylethane, each of the 1,1-dixylylethanes, each of the 1,1-ditolylpropanes, each of the 2,2-ditolylpropanes, each of the 1,1-bis(monochlorophenyl)-ethanes, each of the 1,1-bis(dichlorophenyl)ethanes, each of the 1,1-di(dimethylaminophenyl)ethanes, each of the 1,1-dinaphthylethanes, each of the 1,1-dixenylethanes, each of the 1,1-ditolyl butanes, each of the 2,2-ditolyl butanes, and the like, and their nuclear-substituted halogen, amino, and other derivatives. These substances containing tolyl, xylyl, xenyl, monochlorophenyl, and dichlorophenyl groups may be attached to the carbon atom of the paraffin chain at the ortho, meta, or para positions, and when two of these groups are present, they may be attached in the same or different positions. These compounds are prepared, for example, by the reaction of acetylene or substituted acetylene with a mono- or dialkyl substituted benzene in the presence of a suitable catalyst. Another method that may be employed in the production of diarylalkanes is such as the condensing of an aryl compound with a saturated aliphatic organic compound having a carbonyl group and at least two carbon atoms, e.g., aldehydes, such as acetaldehyde, propionaldehyde, butyraldehyde, etc. in the presence of a suitable catalyst, such as hydrogen fluoride or sulfuric acid. Such compounds when catalytically decomposed yield ring- and/or side chain-substituted styrenes which are useful in the production of thermoplastic polymeric materials.

The catalytic decomposition of the substituted paraffins may be carried out at temperatures varying from about 350° C. up to about 600° C. or even higher, in some cases, in the presence of a suitable cracking catalyst. Inasmuch as temperatures above about 540° C. cause decomposition loss, it is important to preheat the diarylalkane below this temperature, preferably not in excess of 500° C. and within about 40° C. of the decomposition temperature, and to employ as short a time of contact consistent with good mixing of the organic compound with the hot diluent stream before entering the converter.

Any material which is volatile, which does not react with the diaryl-substituted paraffin, and which does not react with the products formed by the conversion of said paraffin may be used as a diluent during the catalytic cracking reaction. Among those which are suitable, for example, are water, i.e., steam, the hydrocarbons, such as benzene and toluene, the fixed gases, such as nitrogen and carbon dioxide, and the like. Steam is the preferred diluent, inasmuch as it may be readily condensed and therefore separated from the products of the reaction, whereas the fixed gases or the hydrocarbons are somewhat more difficult to separate. In the accompanying flow diagram, only a single alkylator 1 and catalytic reactor 41 is shown but it will be apparent that a series of such reactors may be and preferably are utilized.

The catalytically cracked reaction product is withdrawn from the converters at 44 and sent back to line 15 and then to the main fractionator 16 where a separation of toluene, methylstyrene monomer and unconverted diarylalkane is effected. The methylstyrene monomer is withdrawn from the main fractionator at 19 and set to columns 20 and 21 for final purification. Column 21 is a topping column where toluene and ethyl benzene are removed at 22 and the product set through 23 to a finishing column where purified methylstyrene monomer is taken overhead at 24. The low molecular weight polymeric impurity removed in the finishing column is discarded.

The catalytic conversion of these paraffins having at least two carbon atoms and having two aryl substituents attached to one of said carbon atoms is well known. Polymers prepared from the cracked product are useful for a variety of purposes for which resins are employed, e.g., as molding compositions, for coatings or as ingredients in surface coatings and the like. The Dixon U.S. Patent Nos. 2,422,163; 2,422,164; and 2,422,165 disclose various catalysts which may be employed for the decomposition reaction in the cracker 41. Upon partial decomposition of the substituted paraffins, a plurality of organic compounds is obtained. The mixture contains undecomposed diarylalkane, the vinyl-substituted polymerizable aryl compounds and other alkyl-substituted compounds. For example, when a diarylalkane, such as 1,1-ditolylethane is synthesized from acetylene and toluene and is then partially catalytically converted, the resulting mixtures contain 1,1-ditolylethane, methylstyrene, a small percentage of ethyltoluene, toluene, 1,1-ditolylethylene and tarry material. Where a 1,1-dixylylethane is synthesized and converted, the resulting mixture contains undecomposed 1,1-dixylylethane, dimethylstyrene, a small amount of ethylxylene, xylene, dixylylethylene and tarry material.

Conventional valves, temperature control, temperature regulator, and the like may be employed throughout the equipment to permit control of the process of the invention.

Reference to FIGS. 2–4 of the drawings show graphically the important advantages obtained by the removal, from the alkylator feed to be catalytically cracked, the small fractions of the lowest and highest boiling material.

FIG. 2 shows the diminishing conversion of a ditolylethane feed with increased amounts of sulfur in the feed expressed in parts per million. Data obtained in connection with FIG. 2 is set forth below in Table I.

TABLE I

*Effect of Total Sulfur on Cracking of DTE*

| Sulfur conc., p.p.m. | Conversion of DTE, percent |
|---|---|
| 0 | 60 |
| 300 | 58 |
| 500 | 55 |
| 1,000 | 51 |
| 2,000 | 45 |

FIG. 3 shows the comparative results when cracking streams in which one or both or none of the lowest and highest boiling fractions have been removed. Data derived from feeds cracked according to the composition of each of these runs is set forth below in Table II.

TABLE II

*Effect of Distillation on Removal of Impurities and on DTE Cracking Conversions*

| Sample | Conversion, percent |
|---|---|
| I. Undistilled DTE | 43 |
| II. 2% light ends removed | 58 |
| III. 2% heavy ends removed | 58 |
| IV. 2% light end and 2% heavy end removed | 63 |

The removal of sulfur with each cut withdrawn during fractional distillation of the alkylate feed is shown by FIG. 4. It is seen thereby that the removal of approximately 90% of the sulfur is effected by removal from the feed the lowermost boiling 5%, preferably lowermost 2% and the uppermost boiling fraction of about 2%.

The following examples are further illustrative of the invention.

EXAMPLE 1

Through a reactor tube packed with 210 parts of a kaolin on alundum catalyst which is heated and maintained at a temperature between about 500° C. and 540° C. is passed an intimate mixture consisting of 360 parts of purified 1,1-bis-ditolylethane and 1,500 parts of water vapor per hour. A total of 720 parts of ditolylethane is passed through the tube and 715 parts of condensed oil are recovered. The condensate is distilled to yield 460 parts of a light oil boiling below 200° C. and 260 parts unconverted ditolylethane. This represents a 63% conversion of the ditolylethane. Subsequent analysis of the low boiling fraction showed it to contain 97% of the theoretical amount of the desired monomethylstyrene.

EXAMPLE 2

When a sample of purified ditolylethane to which has been added 0.2% (2,000 p.p.m.) of sulfur was catalytically cracked under the same conditions as in Example 1, there was obtained on distillation of the reactor effluent only 334 parts of the light oil boiling below 200° C. and 381 parts of unconverted ditolylethane representing a conversion of only 45%. This result together with results obtained with various other concentrations of sulfur are given in Table I. The yield of the desired methylstyrene obtained in the experiments in which sulfur was present in the ditolylethane varied from 92–96%.

EXAMPLE 3

When 720 parts of a sample of ditolylethane withdrawn from the monomethylstyrene plant at a point equivalent to line 25 (see FIG. 1) and containing 700 p.p.m. of total sulfur was cracked under the conditions described in Example 1, there was obtained 310 parts (43% conversion) of light oils boiling below 200° C. and 405 parts of unconverted ditolylethane.

EXAMPLE 4

The ditolylethane sample mentioned in Example 3 containing 700 p.p.m. of sulfur was fractionally distilled taking 2 weight percent cuts up to 6 weight percent distilled; then 5 weight percent cuts up to 96% distilled; one more 2 weight percent cut and leaving 2 weight percent undistilled residue. Each of the cuts and the residue were analyzed for sulfur content by X-ray analysis. This analysis showed that the first 2 weight percent contained 1.75% sulfur which corresponds to 50% of the initial sulfur present in the sample. The second and third 2 weight percent cuts contained 8% of the initial sulfur. The sulfur level in the fraction between 6 and 98% of the ditolyl ethane distilled contained less sulfur than was detectable by the instrument (<50 p.p.m.). The residual 2% of the original charge contained 26% of the original sulfur. The results of this distillation are shown graphically in FIG. 4.

EXAMPLE 5

Cracking of the ditolylethane without the lowest boiling 2% and the highest boiling 2% (residual material) under conditions described in Example 1 gave a 63% conversion of the ditolylethane to light oils boiling below 200° C. This experiment and cracking results obtained with various other fractions of the impure ditolylthane are given in Table II.

We claim:

1. In the method of catalytically cracking unsymmetrical diarylalkanes having at least two carbon atoms and having the two aryl substituents attached to one of said carbon atoms to produce ring-substituted polymerizable compounds wherein the substituent on the ring is selected from the group consisting of lower alkyl radicals having 1–4 carbon atoms and halogen atoms, the improvement which comprises removing from the diarylalkane cracking feed by fractional distillation not more than the lowest boiling 5% fraction and not more than 5% of the highest boiling residual fraction.

2. In the method of catalytically cracking unsymmetrical diarylalkanes having at least two carbon atoms and having the two aryl substituents attached to one of said carbon atoms to produce ring-substituted polymerizable compounds wherein the substituent on the ring is selected from the group consisting of lower alkyl radicals having 1–4 carbon atoms and halogen atoms, the improvement which comprises removing from the diarylalkane cracking feed by fractional distillation not more than the lowest boiling 2% fraction and not more than 2% of the highest boiling residual fraction.

3. In a method of producing methylstyrene by the catalytic cracking of 1,1-ditolylethane, the improvement comprising removing from the ditolylethane cracking feed by fractional distillation the lowest boiling 2% fraction and the highest boiling 2% residual fraction.

4. In a method of producing dimethylstyrene by the catalytic cracking of 1,1-dixylylethane, the improvement comprising removing from the dixylylethane cracking feed by fractional distillation the lowest boiling 2% fraction and the highest boiling 2% residual fraction.

5. In a method of producing chlorostyrene by the catalytic cracking of 1,1-bis(chlorophenyl)ethane, the improvement comprising removing from the bis(chlorophenyl) ethane cracking feed by fractional distillation the lowest boiling 2% fraction and the highest boiling 2% residual fraction.

6. In the method of catalytically cracking unsymmetrical diarylalkanes having at least two carbon atoms and having the two aryl substituents attached to one of said carbon atoms to produce ring-substituted polymerizable compounds wherein the substituent on the ring is selected from the group consisting of lower alkyl radicals having 1–4 carbon atoms and halogen atoms, the improvement which comprises removing from the diarylalkane cracking feed by fractional distillation not more than the lowest boiling 5% fraction and not more than 5% of the highest boiling residual fraction, and recycling said lowest boiling fraction.

References Cited in the file of this patent
UNITED STATES PATENTS 2,752,296    Lazare _____ June 26, 1956

UNITED STATES PATENT OFFICE
CERTIFICATE OF CORRECTION

Patent No. 3,025,330                           March 13, 1962

David S. Hoffenberg et al.

It is hereby certified that error appears in the above numbered patent requiring correction and that the said Letters Patent should read as corrected below.

Column 5, TABLE II, column 2, line 2 thereof, for "58" read -- 45 --.

Signed and sealed this 4th day of September 1962.

(SEAL)
Attest:

ERNEST W. SWIDER
Attesting Officer

DAVID L. LADD
Commissioner of Patents